United States Patent [19]
Rivet

[11] Patent Number: 6,147,888
[45] Date of Patent: Nov. 14, 2000

[54] VOLTAGE CONVERTING CIRCUIT

[75] Inventor: Bertrand Rivet, Angers, France

[73] Assignee: STMicroelectronics S.r.l., Agrate Brianza, Italy

[21] Appl. No.: 09/303,017

[22] Filed: Apr. 30, 1999

[30] Foreign Application Priority Data

Apr. 30, 1998 [FR] France ................................. 98 05751

[51] Int. Cl.⁷ .............................................. H02M 7/04
[52] U.S. Cl. .................................... 363/143; 363/59
[58] Field of Search ........................... 363/143, 59, 60, 363/61, 142

[56] References Cited

U.S. PATENT DOCUMENTS

| | | | |
|---|---|---|---|
| 3,772,583 | 11/1973 | Sahara et al. | 363/143 |
| 4,451,743 | 5/1984 | Suzuki et al. | 307/110 |
| 5,097,402 | 3/1992 | Kriz et al. | 363/61 |
| 5,187,421 | 2/1993 | Naito | 320/1 |
| 5,414,614 | 5/1995 | Fette et al. | 363/59 |
| 5,581,454 | 12/1996 | Collins | 363/59 |
| 5,712,777 | 1/1998 | Nicollini et al. | 363/60 |
| 5,781,427 | 6/1998 | Moreau | 363/61 |

FOREIGN PATENT DOCUMENTS

| | | |
|---|---|---|
| 0 386 261 A1 | 9/1990 | European Pat. Off. |
| 0 601 593 A2 | 6/1994 | European Pat. Off. |
| 0 772 280 A1 | 5/1997 | European Pat. Off. |
| 40 07 953 A1 | 9/1991 | Germany |
| 196 03 544 A1 | 8/1997 | Germany |

*Primary Examiner*—Peter S. Wong
*Assistant Examiner*—Rajnikant B. Patel
*Attorney, Agent, or Firm*—Theodore E. Galanthay; Robert Iannucci; Seed IP Law Group PLLC

[57] ABSTRACT

The present invention relates to a voltage converting circuit adapted to being supplied by at least two rectified A.C. voltages of different levels, including at least two capacitors and a switching circuit to organize a parallel discharge of the capacitors, and to organize a series or parallel charge of the capacitors according to a supply voltage level.

23 Claims, 4 Drawing Sheets

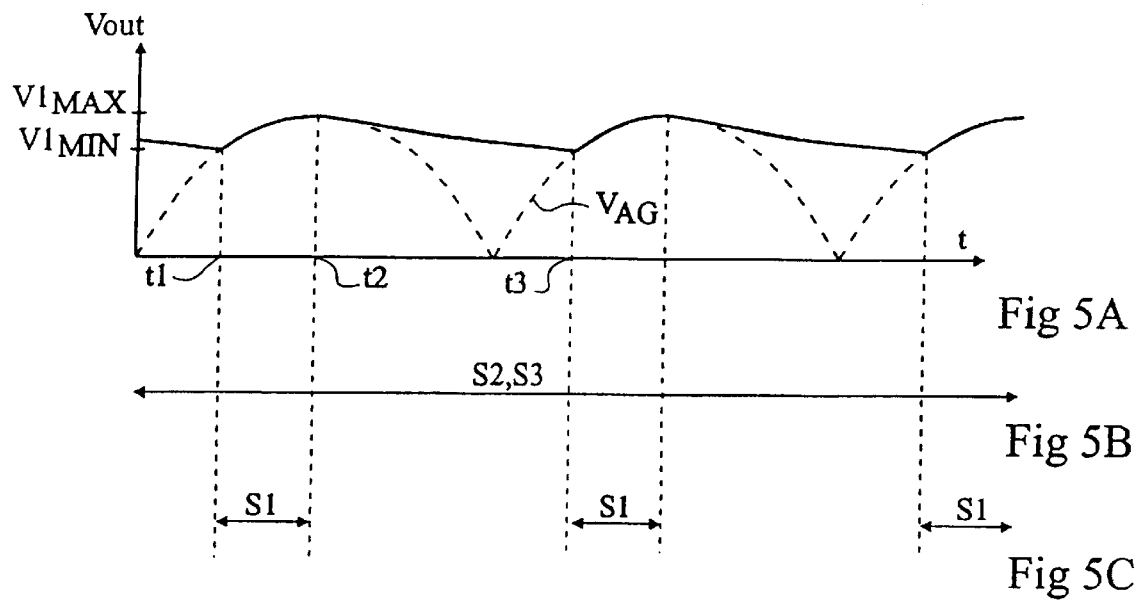
Fig 5A
Fig 5B
Fig 5C
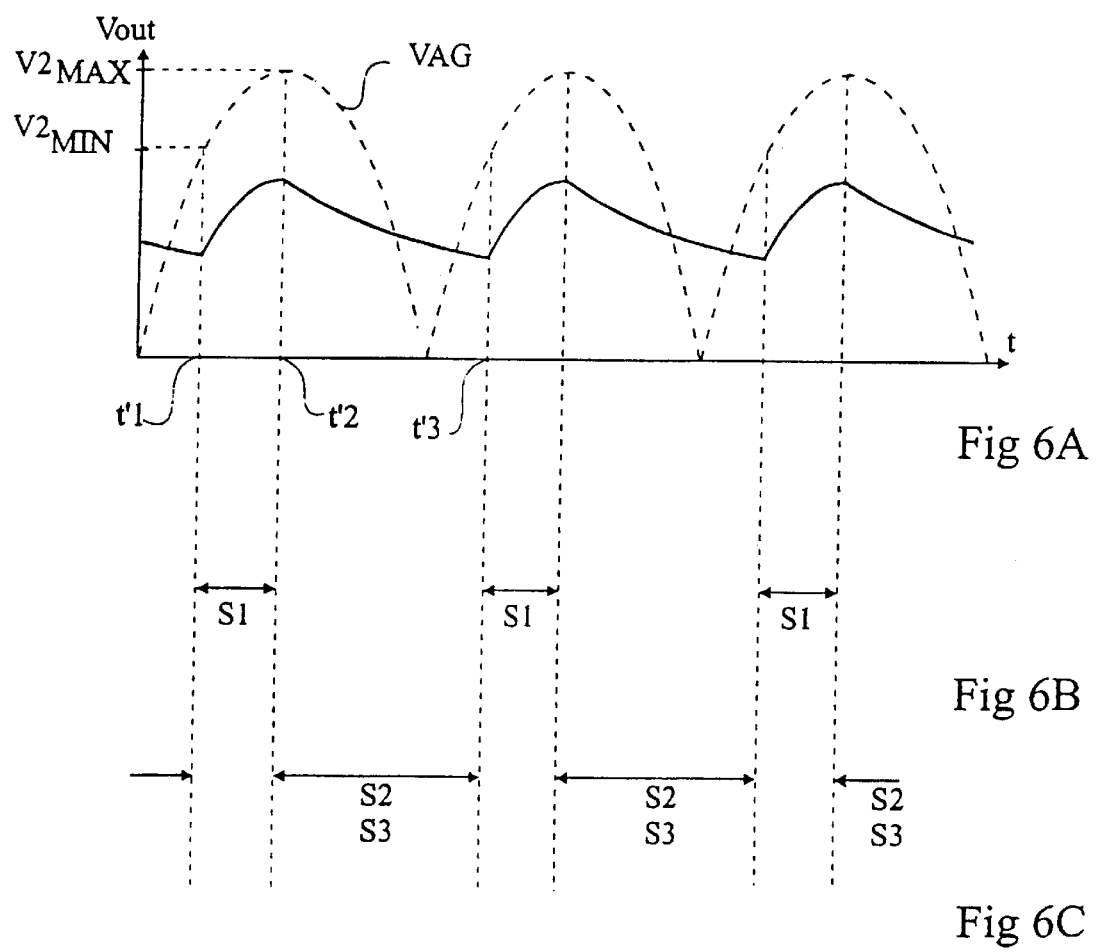
Fig 6A
Fig 6B
Fig 6C 6,147,888

VOLTAGE CONVERTING CIRCUIT

TECHNICAL FIELD

The present invention generally relates to any electric device meant to receive a supply from a mains supply network. More specifically, the present invention relates to electric devices likely to be supplied from networks of different voltage levels.

BACKGROUND OF THE INVENTION

In any electric device, the effective power required for its proper operation is independent from the supply voltage. Thus, devices designed to operate under a 110-volt mains voltage are sized to withstand relatively high currents, while devices meant to be used under a 220-volt mains voltage are sized to withstand relatively high voltages. In other words, for a given operating power, the fact that a device is provided for, for example, two supply voltages (respectively 110 and 220 volts), imposes that its components have to withstand a current linked to the lowest voltage and a voltage linked to the highest voltage.

Therefore, for a device to be usable with any power supply, a simultaneous voltage and current oversizing must be provided.

In many applications, the A.C. mains voltage, whatever its value, has to be converted into a D.C. component. The characteristics of the converters used then depend on the supply.

FIG. 1 illustrates an example of conversion of an A.C. voltage Vin, of a given level chosen between several mains voltages, applied to the input terminals of a diode rectifying bridge 1. Conventionally, a load is connected between two output terminals A and G of the bridge. The case of a load to be supplied by a relatively stable voltage is considered hereafter. For example, the load includes the primary winding L1 of a switched-mode power supply (SMPS). To obtain a substantially D.C. load supply voltage, a capacitor Cout is connected, between output terminals A (positive) and G generally defining the ground) of bridge 1 and in parallel with the load to be supplied SMPS). Primary winding L1 of the SMPS supply is controlled by a MOS transistor MN, controlled by a signal which depends on the load applied to the secondary of the SMPS supply. This secondary is formed, for example, of a winding L2 across which are connected in series a diode DL and a circuit to be supplied (not shown). A capacitor CL is mounted in parallel with this circuit and in series with diode DL. The conventional operation of the secondary of the SMPS supply will not be discussed herein.

In such a structure shown in FIG. 1, if It is desired to be able to supply the converter under different voltages, capacitor Cout and transistor MN have to be able to withstand high voltages and high currents. A capacitor or a MOS transistor able to withstand a high voltage are expensive and bulky. Further, such a MOS transistor causes high energy dissipation.

SUMMARY OF THE INVENTION

An embodiment of the present invention provides a voltage converting circuit adapted to being supplied by at least two rectified A.C. voltages of different levels, including at least two capacitors and a switching circuit to organize a parallel discharge of the capacitors, and to organize their series or parallel charge according to a supply voltage level.

According to an embodiment of the present invention, the capacitors are sized according to a supply voltage having a lowest level.

According to an embodiment of the present invention, the converting circuit includes a control circuit to control the switching circuit, wherein the switching circuit is adapted to detecting the supply voltage level.

According to an embodiment of the present invention, applied to a switched-mode power supply, an input of which is adapted to being controlled by a MOS transistor, the MOS transistor is sized for the lowest supply voltage level.

According to an embodiment of the present invention, the converting circuit includes a first switch, a first capacitor, a diode, and a second capacitor connected in series between two terminals of application of a rectified voltage, a second switch in parallel with the second capacitor and the diode, and a third switch in parallel with the first capacitor and the diode.

According to an embodiment of the present invention, the first switch comprises an anode-gate thyristor, the second switch comprises a cathode-gate thyristor in antiparallel with a diode, and the third switch comprises a cathode-gate turn-off thyristor.

According to an embodiment of the present invention, the control circuit is adapted to slightly delaying the turning-on of the cathode-gate turn-off thyristor with respect to a turning-off of the anode-gate thyristor, during a switching from the series association of the capacitors to their parallel association.

The foregoing features and advantages of the present invention will be discussed in detail in the following non-limiting and non-exhaustive description of specific embodiments in connection with the accompanying drawings.

BRIEF DESCRIPTION OF THE DRAWINGS

FIGS. 5A, 5B, and 5C illustrate the operation of the circuit of FIG. 2 for a first supply voltage.

FIGS. 6A, 6B, and 6C illustrate the operation of the circuit in FIG. 2 for a second supply voltage.

DETAILED DESCRIPTION OF THE ILLUSTRATED EMBODIMENTS

Figure 1:
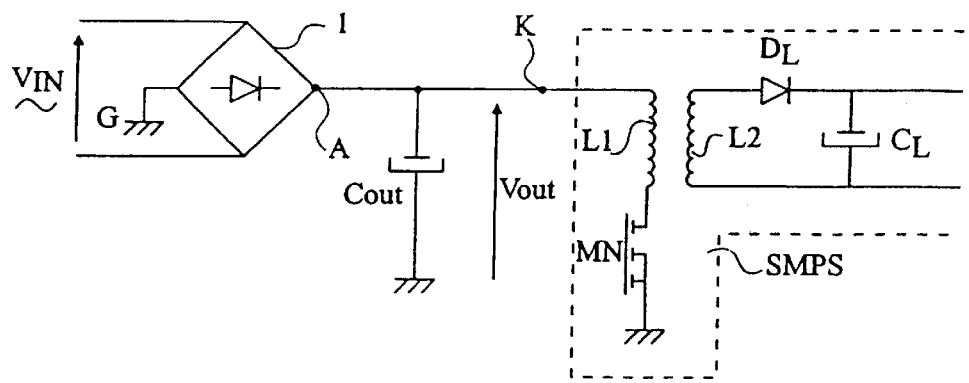
FIG. 1, previously described, is meant to show the state of the art and the problem to solve.

The same elements have been designated with the same references in the different drawings. For clarity, only those elements which are necessary to the understanding of embodiments of the present invention have been shown in the drawings and will be described hereafter.

Figure 2:
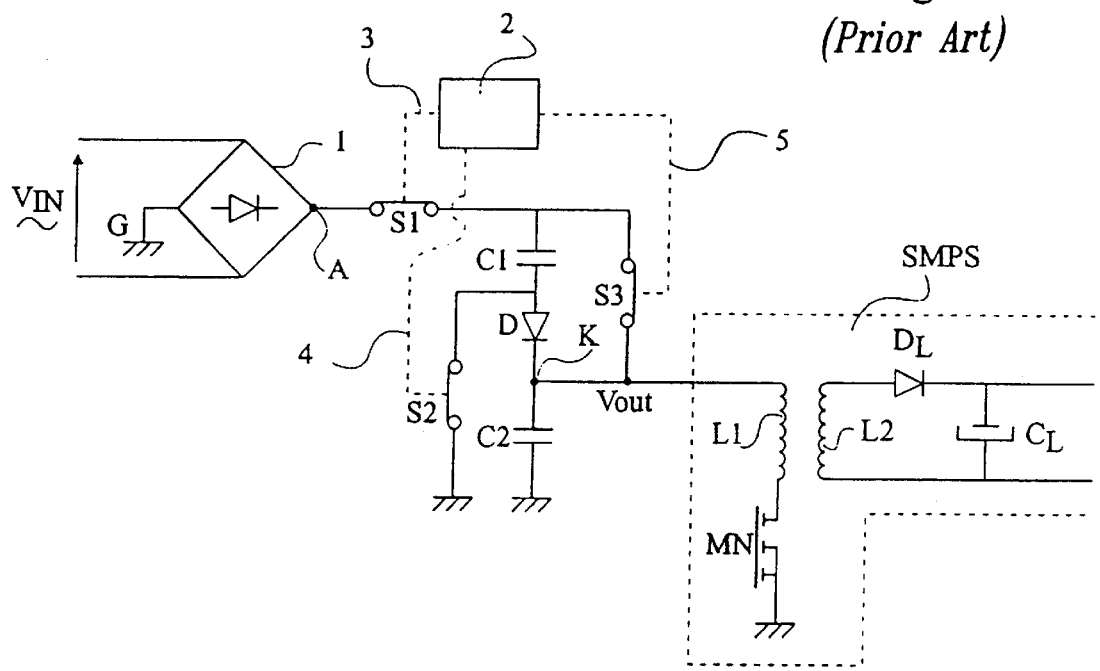
FIG. 2 schematically shows an embodiment of a conversion circuit according to the present invention.

FIG. 2 illustrates a principle of a voltage converting circuit according to an embodiment of the present invention. This circuit receives a rectified A.C. voltage $V_{AG}$, for example, provided by a diode bridge 1, supplied by an A.C. voltage, for example, mains voltage Vin.

According to an embodiment the present invention, a first switch S1, a first capacitor Cl, a diode D, and a second capacitor C2 are connected in series between two output terminals A (positive) and G (generally defining the ground) of bridge 1. A second switch S2 is connected between the anode of diode D and node G, that is, in parallel with diode D and capacitor C2. A third switch S3 is connected between cathode K of diode D and a midpoint of the series connection of first switch S1 and of first capacitor C1, that is, in parallel with capacitor C1 and diode D. Node K comprises an output of the converter circuit of an embodiment of the present invention, providing an output voltage Vout. Elements to be supplied by a substantially D.C. voltage, for example, a switched-mode power supply SMPS such as described in relation with FIG. 1, are connected downstream of node K. Switches S1, S2, and S3 are controlled by a control circuit 2 (using connections 3, 4, and 5 shown in dotted lines).

The operation of the circuit of FIG. 2 is described hereafter in relation with FIGS. 3, 4, 5A, 5B, 5C, 6A, 6B, and 6C. A characteristic of an embodiment of the present invention is that this operation is associated with a level of voltage Vin.

It should be noted that in the discussion of this operation, possible transient phenomena at the switchings will be neglected, as is usual, either that these phenomena are intrinsically negligible, or that the switch control takes them into account, as will be described hereafter. Further, only the steady state is considered, that is, the time after a few halfwaves required for the initial capacitor charge.

A first operating mode corresponds to a case where voltage $V_{AG}$ is of a relatively low level V1, corresponding, for example, to a mains supply of 110 volts RMS. FIGS. 5A, 5B, and 5C respectively illustrate the shape of output voltage Vout of the circuit and the respective on periods of switches S2 and S3 and of switch S1. The circuit has two operating phases in steady state, characterized by different respective states of the switches which are associated with the instantaneous value of rectified voltage $V_{AG}$ (shown as dotted lines in FIG. 5A).

Figure 3:
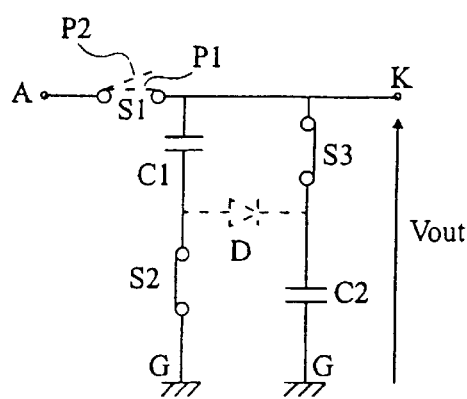
FIGS. 3 and 4 show equivalent diagrams of the circuit of FIG. 2 in two operating phases.

Between times t1 and t2 (see, e.g., FIG. 5A), where voltage $V_{AG}$ is included between a threshold value V1min and its maximum value V1max (approximately $\sqrt{2}$ Vin, minus the voltage drops in the diodes of bridge 1), the three switches S1 (see, e.g., FIG. 5C), S2 and S3 (see, e.g., FIG. 5B) are on, to define a parallel charge path of capacitors C1 and C2, illustrated in FIG. 3 (where switch S1 in position P1). The turning-on and the maintaining in this state of each of switches S1 and S2 may be performed either naturally, or controlled by control circuit 2. The turning-on of switch S3 is controlled by circuit 2. For a duration $t_2-t_1$ (see, e.g., FIG. 5A), each of capacitors C1, C2 charges to reach a maximum charge corresponding to an output voltage Vout equal to V1max. Once voltage $V_{AG}$ has reached its maximum V1max, it starts decreasing and the capacitors (in parallel) C1 and/or C2 have to supply the load (not shown in FIG. 3).

At time t2, switch S1 is turned off. This turning-off may be performed either naturally, or controlled by circuit 2. In this operating mode, switches S2 and S3 are maintained on, so that the load placed downstream, for example a switched-mode power supply (e.g., SMPS of FIG. 2), is supplied by the discharge of capacitors C1 and C2 in parallel.

This state maintains until a time t3 (of the next halfwave, where voltage $V_{AG}$ increases) at which voltage Vout becomes equal to voltage $V_{AG}$. At time t3, switch S1 turns on so that capacitors C1 and C2 charge again in parallel. In the case where the turning-off/turning-on of capacitor S1 is controlled by circuit 2, said circuit is able to evaluate the level of voltage $V_{AG}$ with respect to voltage Vout and thus include a circuit of detection (not shown) of the supply voltage (Vin) or of the rectified voltage ($V_{AG}$).

It should be noted that, in this first operating mode corresponding to a relatively low supply level V1, diode D is off (shown as dotted lines in FIG. 3). It should also be noted that the voltage that each of capacitors C1, C2 has to be able to withstand can be at most equal to the maximum V1max of rectified voltage $V_{AG}$.

A second operating mode corresponds to a case where voltage $V_{AG}$ is of a relatively high level V2, for example, corresponding to a mains supply of 220 volts RMS. FIGS. 6A, 6B, and 6C respectively illustrate the shape of output voltage Vout and the respective turn-on periods of switches S2 and S3 and of switch S1. The circuit has two operating phases in steady state which, as for the first operating mode, is characterized by different respective states of the switches which are associated with the instantaneous value of rectified voltage $V_{AG}$ (shown as dotted lines in FIG. 6A).

Figure 4:
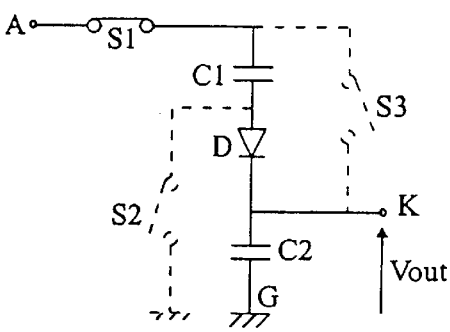

Between times t'1 and t'2 (see, e.g., FIG. 6A), where voltage $V_{AG}$ is included between a threshold value V2min and its maximum value V2max (approximately $\sqrt{2}$ Vin), switch S1 is on (see, e.g., FIG. 6B) and switches S2 and S3 are off (see, e.g., FIG. 6C), to define a series charge path of capacitors C1 and C2 illustrated in FIG. 4. This charge path includes diode D. Thereby, capacitors C1 and C2 charge under a voltage which is smaller than circuit supply voltage $V_{AG}$. For example, if the capacitances of the capacitors are equal, the voltage across capacitor C1 will be slightly greater (for example, by approximately 10%) than the voltage across capacitor C2 due to the power drawn by the charge. The tuming-on of switch S1 and its maintaining in the on state, as well as the turning-off and the maintaining in the off state of switches S2 and S3, may be performed either naturally, or controlled by circuit 2.

Once voltage $V_{AG}$ has reached its maximum V2max, it starts decreasing (e.g., at time t'2, shown in FIG. 6A). Then, the voltage across the series connection of the two capacitors C1, C2 and of diode D becomes greater than the rectified voltage. The series charge of capacitors C1, C2 thus is interrupted by the turning-off of switch S1 (see, e.g., FIG. 6B). Conversely, switches S2 and S3, initially off, are on (see, e.g., FIG. 6C), so that the load placed downstream, for example, an SMPS supply, is maintained supplied at the desired value of voltage Vout. Voltage Vout is maintained by the parallel discharge of capacitors C1, C2 (where switch S1 is in position P2 in FIG. 3). The tuming-off and the maintaining in the off state of switch S1, as well as the turning-on and the maintaining in the on state of switch S2 may be performed either naturally, or controlled by circuit 2. The turning-on of switch S2 is controlled by circuit 2.

This state maintains until a time t'3 (of the next halfwave) at which voltage $V_{AG}$ becomes approximately equal to double the voltage across capacitors C1 and C2 in parallel. At time t'3, switch S1 turns on (see, e.g., FIG. 6C) and switches S2 and S3 turn off (see, e.g., FIG. 6B), so that capacitors C1 and C2 are once again series-connected with diode D (see, e.g., FIG. 4).

It should be noted that, in this second operating mode corresponding to a relatively high supply level V2, the circuit has two successive configurations of capacitor connection. On the one hand, as in the case of a supply at a relatively low level V1, the discharge is performed in parallel (e.g., where switch S1 at position P2 in FIG. 3). On the other hand, the capacitor charge is performed in series (see, e.g., FIG. 4). Thus, the maximum voltage that each of capacitors C1 and/or C2 has to be able to withstand is lower than the maximum converter supply voltage V2max. Substantially equal capacitance values can be chosen for each of capacitors C1 and C2, so that the supply voltage approximately equally distributes on each of the capacitors C1 and C2.

Thus, for a two-voltage device, that is, a device meant to be supplied by a supply of level V1 or V2, the capacitors are sized to be able to withstand, on the one hand, maximum voltage V1max, and on the other hand, a voltage approximately equal to V2max/2 (taking account of the supplied load). In the most current case where the possible supply levels are V1=$\sqrt{2}$*110 V and V2=$\sqrt{2}$*220 V, assuming the capacitances of capacitors C1 and C2 to be equal, these two sizing voltages are substantially equal and are, for example, on the order of 200 volts.

It should be noted that the load elements placed at the converter output, in the considered case, the primary winding L1 of the SMPS supply controlled by the transistor MN (see, e.g., FIG. 2), can also be sized to withstand a voltage of a highest level chosen for the capacitors C1 and C2. In particular, transistor MN can now be sized for a 110-volt mains voltage even though the circuit can operate under 220 volts.

Figure 7:
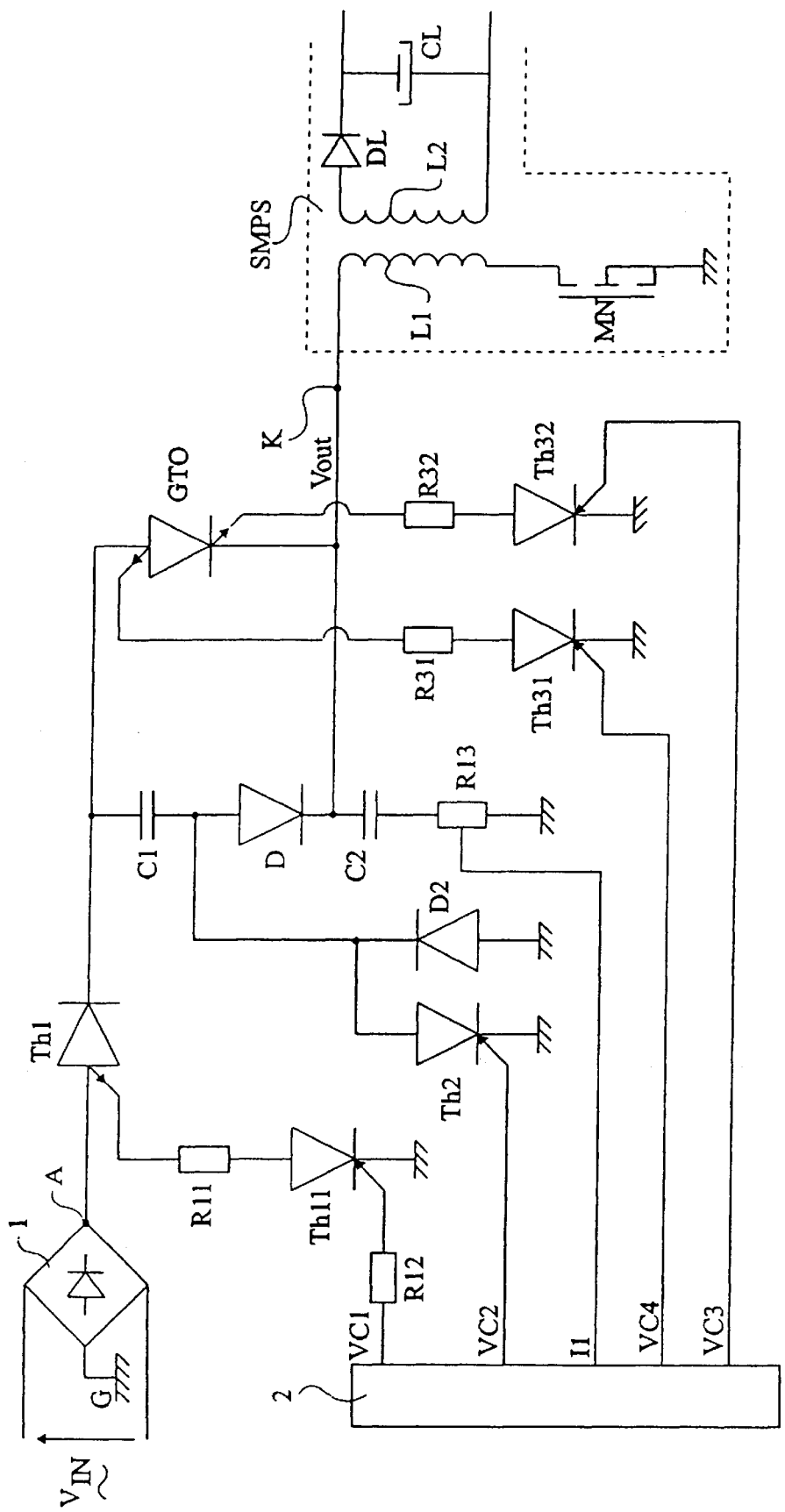
FIG. 7 shows a detailed embodiment of the circuit according to the resent invention.

FIG. 7 shows an embodiment of the switches of the circuit according to the present invention. In this embodiment, a switch S1 controllable to be turned on, that is, an anode gate thyristor Th1, a switch S2 controllable to be turned on, that is, a cathode gate thyristor Th2 in antiparallel with a diode D2, and a switch S3 controllable to be turned off and turned on, that is, a GTO thyristor that can be turned-on through an anode-gate and cathode turned off through a gate, are used. Each of the switch gates is controllable by a same control circuit 2, possibly via level adapting assemblies which will be described hereafter. The function of such level adapting assemblies is to adapt the control signals provided by circuit 2 to the levels required to control the different thyristors Th1, Th2, and GTO.

The operation of the circuit of FIG. 7 is described hereafter in relation with the timing diagrams of FIGS. 8A to 8E. For simplification, the operation of the circuit of FIG. 7 will only be described in relation with a relatively high voltage V2. The operation under a voltage V1 generating simpler switchings (S2 and S3 are always on) will be easily deduced from this description. It should only be noted that, for a voltage V1, circuit 2 permanently provides a turn-on signal VC2 for thyristor Th2 (e.g., a D.C. signal), while for a voltage V2, thyristor Th2 is not controlled and remains off, the function of switch S2 being performed by diode D2.

Figure 8A:
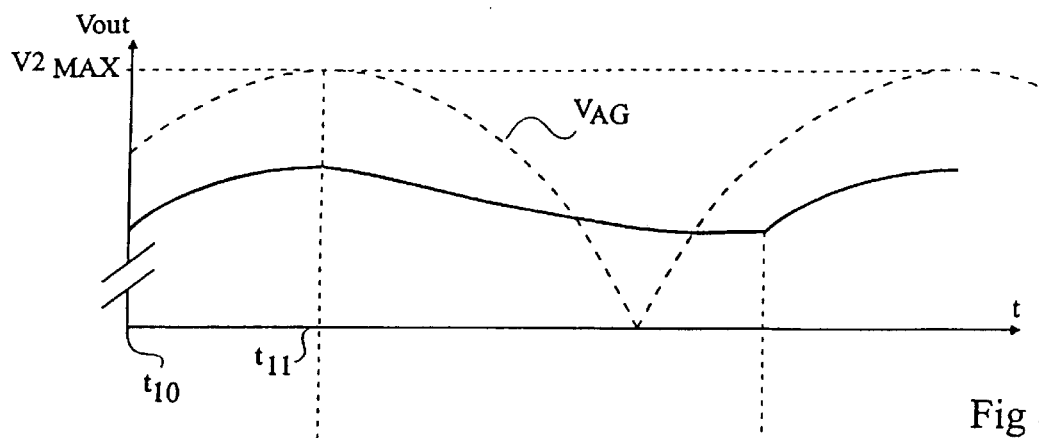
FIGS. 8A to 8G illustrate the operation of the circuit shown in FIG. 7.
Figure 8B:
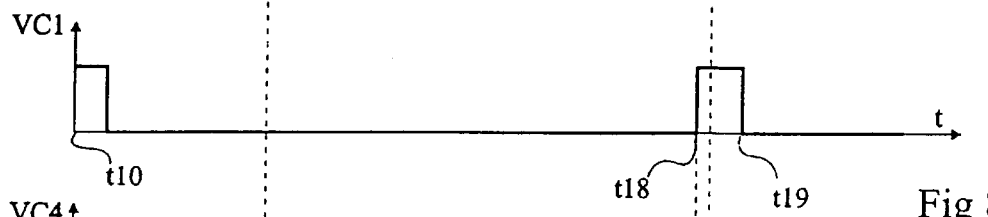
Figure 8C:
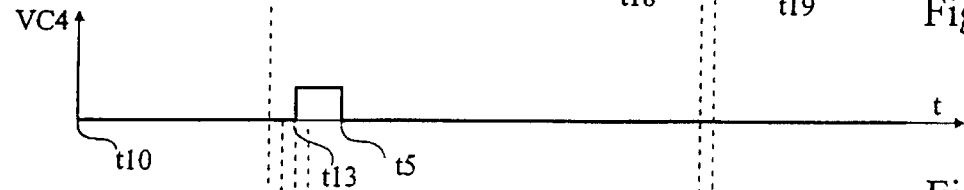
Figure 8D:
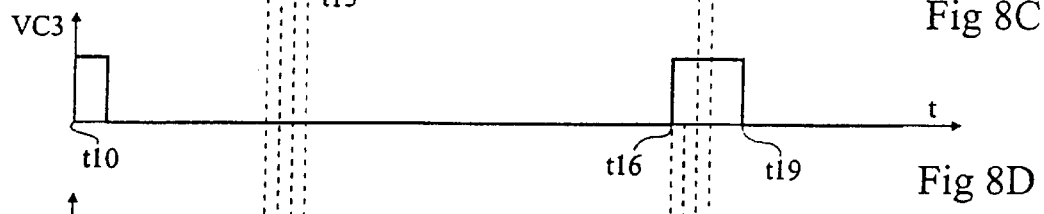
Figure 8E:
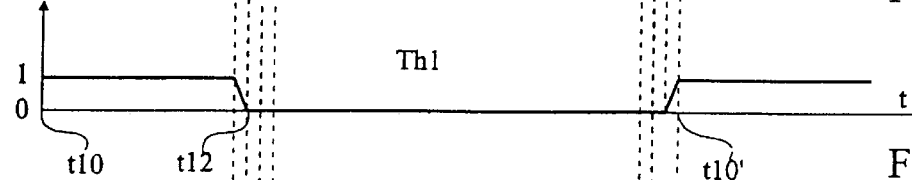
Figure 8F:
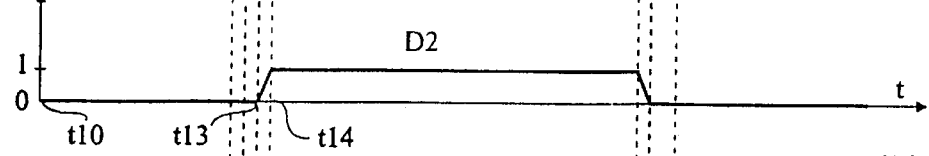
Figure 8G:
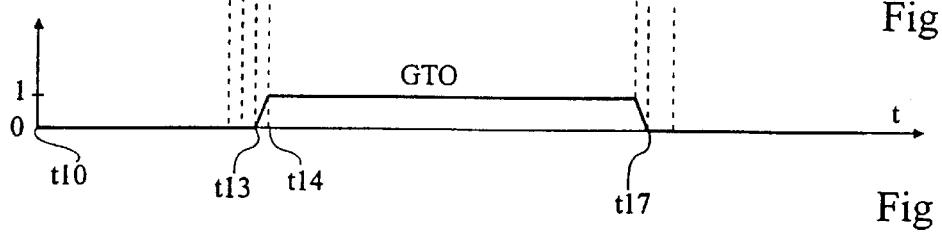

FIG. 8A shows the waveform of voltage Vout. FIGS. 8B, 8C, and 8D show the shape of control signals VC1, VC4, and VC3 provided by circuit 2 to control thyristor Th1 to turn it on and thyristor GTO to turn it on and off. FIGS. 8E, 8F, and 8G show the respective on-state periods of thyristor Th1, of diode D2, and of thyristor GTO in the form of logic diagrams. As usual, a high logic state (1) is associated with an on switch and a low logic state (0) is associated with an off switch.

A conversion cycle starting at an initial time t10 (see, e.g., FIG. 8A) by the series charge of capacitors C1 and C2 is considered. This charge mode characterizes (whatever the converter supply voltage level) by an on state of thyristor Th1. This on state (e.g., logic state 1 in FIG. 8E) of thyristor Th1 as well as the off states (e.g., logic states 0 in FIGS. 8F and 8G) of diode D2 and of thyristor GTO are maintained naturally. This state maintains until a time t11 at which voltage $V_{AG}$ reaches its maximum V2max.

Then, as seen previously, the potential maintained on the cathode of thyristor Th1 by the series connection of capacitors C1, C2 becomes higher than the potential of the anode of thyristor Th1 connected to positive output terminal A of bridge 1. From this time t11, thyristor Th1 thus tends to naturally turn off. This turning-off is achieved at a time t12 when thyristor Th1 is blocked (e.g., logic state 0 in FIG. 8E).

In the case shown of a supply of relatively high level V2, as discussed previously in relation with FIGS. 3, 4, 6A, 6B, and 6C, switches S2 and S3 initially in an off state (e.g., logic state 0 in FIGS. 8F and 8G) switch to an on state (e.g., logic state 1 in FIGS. 8F and 8G). For this purpose, at a time t13, control circuit 2 provides a control signal VC4 in the form of pulses (see, e.g., FIG. 5C) to the anode gate of thyristor GTO. In practice, as illustrated in FIG. 7, turn-on pulse VC4 can be provided, via a first leveling assembly, to the anode gate of thyristor GTO. This first assembly is formed of a thyristor Th31 and of a resistor R3 mounted in series between the gate of thyristor GTO and the ground, pulse signal VC4 being provided to the cathode gate of thyristor Th31.

At a time t14, thyristor GTO is on (e.g., logic state 1 in FIG. 8G). It should be noted that diode D2 naturally follows the state of thyristor GTO as illustrated in FIG. 8F. The discharge path of capacitor C1 then includes diode D2 and thyristor GTO. The discharge path of capacitor C2 includes, in the example shown, resistor R13, the function of which will be explained hereafter.

It should also be noted that duration t5–t13 (see, e.g., FIG. 8C) of turn-on pulse VC4 is chosen to be sufficiently long (longer than duration t14–t13) for the controlled thyristor to take the desired state, and sufficiently short for a given command to be stopped before applying an opposite command.

It will be ascertained, as illustrated in FIG. 8C, that turn-on signal VC4 of thyristor GTO is provided at a time subsequent to time t12. This delay (t13–t12) ensures that thyristor Th1 is completely off. That is, the current flowing therethrough has effectively canceled when the parallel discharge path establishes. It should be noted that this delaying of the turn-on command with respect to the detection of the passing through a maximum of rectified voltage $V_{AG}$ may be performed by any appropriate means, for example, either "naturally" by introducing a delay circuit in control circuit 2, or by measuring, via a resistor R13, current I1, as illustrated in FIG. 7.

The parallel discharge configuration of the capacitors C1 and C2 is maintained until a time t10'.

To switch from the parallel discharge configuration to a series charge configuration, the turning-on of thyristor Th1 and the tuming-off of thyristor GTO has to be implemented (as well as the tuning-off of diode D2).

The tuning-on of thyristor Th1 is controlled by a pulse VC1 (see, e.g., FIG. 8B) provided on its anode gate by circuit 2, via a second leveling assembly. This second assembly is formed of a resistor R11 and of a thyristor Th11 mounted in series between the anode gate of thyristor Th1 and terminal G. In practice, control signal VC1 can be provided to the cathode gate of thyristor Th11 via a resistor R12.

Given the delays inherent to the imperfection of effective devices, to avoid any short-circuiting or any malfunction (overvoltage or overcurrent) in the device, it should be ensured that switch GTO actually is off (e.g., logic state 0 in FIG. 8G) at the time when thyristor Th1 switches on (e.g., at time t10'). For this purpose, at a time t16, the turning-off of thyristor GTO is controlled by a control pulse VC3 (see, e.g., FIG. 8D), via a third leveling assembly. This third assembly is formed of a resistor R32 and of a thyristor Th32, mounted in series between the cathode gate of thyristor GTO and ground terminal G. Control signal VC3 is directly provided to the cathode gate of thyristor Th32. At a time t17, thyristor GTO is off (see, e.g. FIG. 8G). The variation of the current in diode D2 follows that in thyristor GTO, and diode D2 thus naturally turns off at the same time as thyristor GTO (neglecting the diode recovery time).

When it is sure that thyristor GTO is off, that is, at a time t18 (see, e.g., FIG. 8B) subsequent to time t17, the turning on of thyristor Th1 is triggered by applying control signal VC1.

It will be ascertained that the series charge configuration is implemented at time t10' (see, e.g., FIG. 8E). That is, thyristor Th1 actually is on at the very time when voltage Vout becomes equal to voltage VAG. Given the time required to switch on (e.g., logic state 1 in FIG. 8E) thyristor Th1, signal VC1 is in fact provided at time t18 which is prior to time t10'. The operation of the circuit then repeats in a way similar to that discussed from time t10.

It should however be noted that in another embodiment (not shown), according to the characteristics of the components used, time t18 of turn on control of thyristor Th1 may be different, for example, included between times t16 and t17.

It will be ascertained that the durations of control pulse VC1 (see, e.g., FIG. 8B) for turning on thyristor Th1 and, if present, of control pulse VC3 (see, e.g., FIG. 8D) for turning off thyristor GTO are chosen to be sufficiently long for the controlled thyristor to take the desired state, and sufficiently short for a given command to be stopped before applying an opposite command.

It should be noted that the stopping times of commands VC1 and VC3 are considered as being identical (e.g., time t19 in FIGS. 8B and 8D) as an example only. They may be different, provided that they respect the preceding conditions.

In the case of a supply at a relatively low level V1, as discussed previously in relation with FIGS. 3, 5A, 5B, and 5C, switches S2 and S3 remain on (completely closed) during the discharge of the capacitors C1, C2. It is sufficient not to trigger the opening of thyristor GTO by signal VC3 after it has been turned on for the discharge path of capacitor C1 via diode D2 and thyristor GTO to establish.

For the charge, capacitors C1 and C2 also are placed according to a parallel charge configuration. This is done by turning on thyristor Th1 as discussed in relation with voltage level V2. If thyristor Th2 is controlled by a D.C. signal, it automatically turns on at each charge period (and turns off at each discharge period). Otherwise, it will be ascertained to control its turning on in a way adapted to turning on thyristor Th1 to establish the charge path of capacitor C1.

It should be noted that control circuit 2 is capable of measuring the supply level to choose a switching mode according to the given supply level.

An advantage of the present invention is to enable, whatever the A.C. supply voltage provided by the mains, using an A.C./D.C. conversion circuit including a charge storage means (C1, C2) sized for low voltages. Another advantage of the present invention is to provide such a circuit enabling control of a primary winding L1 of a switched-mode power supply SMPS by means of a switch (MN) sized for a relatively low voltage compared to the maximum possible supply level.

Of course, the present invention is likely to have various alterations, modifications, and improvements which will readily occur to those skilled in the art. For instance, switches S1, S2, and S3 as well as the corresponding control circuit 2 may be modified appropriately to obtain the desired operations (switching sequence and parallel discharge, series (V1) or parallel (V2) charge configurations) previously discussed in relation with FIGS. 5A, 5B, 6A, and 6B. Further, the load may be other than a switched-mode power supply SMPS and may, like transistor MN, be sized for a relatively low voltage.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in he following claims, which are to be construed in accordance with established doctrines of claim interpretation.

What is claimed is:

1. A voltage converting circuit adapted to being supplied by at least two rectified A.C. voltages of different levels across first and second supply terminals, comprising a first capacitor, a second capacitor, and a switching circuit to organize a parallel discharge of the capacitors and to organize a series or parallel charge of the capacitors according to respectively a high or low supply voltage level, wherein the switching circuit includes:

a diode:

a first switch connected with the diode and the first and second capacitors between the first and second supply terminals, the first switch being structured to open in response to the first supply terminal reaching the high supply voltage level;

a second switch in parallel with the second capacitor and the diode; and a third switch in parallel with the first capacitor and the diode.

2. The converting circuit of claim 1 wherein the two rectified voltages are obtained by rectifying mains voltages.

3. The converting circuit of claim 1 wherein the capacitors are sized according to a supply voltage having a lowest level.

4. The converting circuit of claim 1, further comprising a control circuit to control the switching circuit, wherein the switching circuit is adapted to detect the supply voltage level.

5. The converting circuit of claim 1 wherein an output of the converting circuit is applied to a switched-mode power supply (SMPS), an input of the SMPS adapted to being controlled by a MOS transistor, wherein the MOS transistor is sized for a lowest supply voltage level.

6. The converting circuit of claim 1
wherein the first switch includes a thyristor.

7. A voltage converting circuit adapted to being supplied by at least two rectified A.C. voltages of different levels, comprising:

first and second capacitors; and a switching circuit to organize a parallel discharge of the capacitors and to organize a series or parallel charge of the capacitors according to respectively a high or low supply voltage level, wherein the switching circuit includes:

an anode-gate thyristor and a first diode connected with the capacitors between two terminals of application of the rectified voltages;

a cathode-gate thyristor in antiparallel with a second diode and in parallel with the second capacitor and the first diode; and a cathode-gate turn-off thyristor in parallel with the first capacitor and the first diode.

8. The converting circuit of claim 7, further comprising a control circuit to control the switching circuit by slightly delaying a turning-on of the cathode-gate turnoff thyristor with respect to a turning-off of the anode-gate thyristor during a switching from a series association of the first and second capacitors to a parallel association.

9. A voltage converting circuit operable to receive at an input node a first input voltage and a second input voltage higher than the first input voltage, the converting circuit comprising:

first and second capacitors coupled to an output node of the converting circuit; and a switching circuit coupled to the first and second capacitors and operable to connect the first and second capacitors in a parallel or in a series connection, the switching circuit connecting the first and second capacitors in the parallel connection and allowing the parallel-connected first and second capacitors to discharge through the output node if the first input voltage is applied, the switching circuit connecting the first and second capacitors in the series connection to charge the first and second capacitors and connecting the first and second capacitors in the parallel connection to allow the parallel-connected first and second capacitors to discharge through the output node if the second input voltage is applied, wherein the switching circuit includes:

a diode coupled between the first and second capacitors;

a first switch connecting the first capacitor to the input node, the first switch being structured to open in response to the first supply terminal reaching the high supply voltage level;

a second switch in parallel with the second capacitor and the diode; and a third switch in parallel with the first capacitor and the diode.

10. The converting circuit of claim 9 wherein the first and second voltages are obtained from mains voltages.

11. The converting circuit of claim 9 wherein the first and second capacitors are sized according to a supply voltage providing the first input voltage.

12. The converting circuit of claim 9, further comprising a control circuit operable to control the switching circuit based on changing levels of the first and second input voltages.

13. The converting circuit of claim 9 wherein the first switch includes a thyristor.

14. A voltage converting system, comprising:

a switched-mode power supply (SMPS);

a voltage converting circuit operable to receive a first input voltage and a second input voltage higher than the first input voltage, the converting circuit having an output node coupled to an input node of the SMPS;

first and second capacitors coupled to the output node of the converting circuit;

a switching circuit coupled to the first and second capacitors and operable to connect the first and second capacitors in a parallel or in a series connection, the switching circuit connecting the first and second capacitors in the parallel connection and allowing the parallel-connected first and second capacitors to discharge through the output node to the input node of the SMPS if the first input voltage is applied, the switching circuit connecting the first and second capacitors in the series connection and connecting the first and second capacitors in the parallel connection to allow the parallel-connected first and second capacitors to discharge through the output node to the input node of the SMPS if the second input voltage is applied; and a control circuit having a thyristor and operable to control the switching circuit based on changing levels of the first and second input voltages.

15. The system of claim 14 wherein the first and second input voltages are obtained from mains voltages.

16. The system of claim 14, further comprising a control circuit operable to control the switching circuit based on changing levels of the first and second input voltages.

17. The system of claim 14 wherein the SMPS comprises a primary winding and a MOS transistor connected to the input node, wherein the MOS transistor is operable to control the input node.

18. A method of providing an output voltage to a switched-mode power supply (SMPS), the method comprising:

supplying first and second voltages to a converting circuit having first and second capacitors, the first voltage being lower than the second voltage;

connecting the first and second capacitors in parallel to charge the capacitors if the first voltage is supplied;

discharging the parallel-connected first and second capacitors to provide the output voltage to the SMPS if the first voltage is applied;

connecting the first and second capacitors in series to charge the capacitors if the second voltage is supplied;

connecting and discharging the first and second capacitors in parallel to provide the output voltage to the SMPS if the second voltage is applied;

disconnecting the first and second capacitors from the second voltage in response to detecting that the second voltage has been attained.

19. The method of claim 18 wherein the first and second voltages comprise mains voltages.

20. The method of claim 18, further comprising switching the first and second capacitors between connecting and discharging.

21. The method of claim 18, further comprising:

switching the first and second capacitors between connecting and discharging; and controlling switching of the first and second capacitors based on voltage levels of the first and second voltages.

22. The method of claim 18, further comprising sizing the first and second capacitors according to a supply voltage level having a lowest level.

23. The method of claim 18, further comprising:

switching the first and second capacitors between the series and parallel connections; and controlling switching the first and second capacitors by delaying a turn-on of a first thyristor with respect to a turn-off of a second thyristor.

* * * * *

UNITED STATES PATENT AND TRADEMARK OFFICE
CERTIFICATE OF CORRECTION

PATENT NO. : 6,147,888
DATED : November 14, 2000
INVENTOR(S) : Bertrand Rivet

It is certified that error appears in the above-identified patent and that said Letters Patent is hereby corrected as shown below:

Title page,
Item [73], the Assignee should read -- STMicroelectronics, S.A., Gentilly, France --

Signed and Sealed this

Sixth Day of November, 2001

Attest:

NICHOLAS P. GODICI
*Attesting Officer*          *Acting Director of the United States Patent and Trademark Office*